United States Patent
Avci et al.

(10) Patent No.: US 10,673,763 B2
(45) Date of Patent: *Jun. 2, 2020

(54) LEARNING OR EMULATION APPROACH TO TRAFFIC ENGINEERING IN INFORMATION-CENTRIC NETWORKS

(71) Applicant: Futurewei Technologies, Inc., Plano, TX (US)

(72) Inventors: Serhat Nazim Avci, Sunnyvale, CA (US); Cedric Westphal, San Francisco, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/058,277

(22) Filed: Aug. 8, 2018

(65) Prior Publication Data

US 2018/0351869 A1    Dec. 6, 2018

Related U.S. Application Data

(60) Continuation of application No. 15/843,937, filed on Dec. 15, 2017, now Pat. No. 10,218,623, which is a
(Continued)

(51) Int. Cl.
*H04L 12/803*    (2013.01)
*H04L 12/26*    (2006.01)
(Continued)

(52) U.S. Cl.
CPC .......... *H04L 47/125* (2013.01); *H04L 41/145* (2013.01); *H04L 41/5038* (2013.01);
(Continued)

(58) Field of Classification Search
CPC ... H04L 47/125; H04L 43/50; H04L 41/5038; H04L 41/145; H04L 51/5096; H04L 41/04; H04L 45/70
See application file for complete search history.

(56) References Cited

U.S. PATENT DOCUMENTS 7,222,344 B2    5/2007    Mentero et al.
7,929,425 B1    4/2011    Chou
(Continued)

FOREIGN PATENT DOCUMENTS

| EP | 2640025 A1 | 9/2013 |
|---|---|---|
| EP | 2169914 B1 | 4/2014 |
| WO | 0215418 A2 | 2/2002 |

OTHER PUBLICATIONS

Ahlgren, B., et al., "A Survey of Information-Centric Networking," IEEE Communications Magazine, Jul. 2012, pp. 26-36.
(Continued)

*Primary Examiner* — Omar J Ghowrwal
(74) *Attorney, Agent, or Firm* — Conley Rose, P.C.

(57) ABSTRACT

A method implemented in a network element (NE) configured to operate in an information centric network (ICN) including receiving a test traffic flow as a copy of a traffic flow in a forwarding plane of the ICN during a defined interval, emulating the ICN at a state determined at an arrival time of the test traffic flow based on an active traffic flow in the ICN, measuring a first impact of a first candidate path for the test traffic flow in the emulated ICN to the active traffic flow, selecting the first candidate path based on the first impact measurement, and constructing a forwarding rule based on the state and the selection of the first candidate path.

7 Claims, 9 Drawing Sheets

Related U.S. Application Data division of application No. 14/825,817, filed on Aug. 13, 2015, now Pat. No. 9,871,730.

(60) Provisional application No. 62/040,957, filed on Aug. 22, 2014.

(51) Int. Cl.
*H04L 12/24* (2006.01)
*H04L 12/721* (2013.01)

(52) U.S. Cl.
CPC .............. *H04L 43/50* (2013.01); *H04L 41/04* (2013.01); *H04L 41/5096* (2013.01); *H04L 45/70* (2013.01)

(56) References Cited

U.S. PATENT DOCUMENTS

| | | |
|---|---|---|
| 9,871,730 B2 | 1/2018 | Avci et al. |
| 2008/0080473 A1 | 4/2008 | Thubert et al. |
| 2009/0003226 A1 | 1/2009 | Wang et al. |
| 2012/0275403 A1 | 11/2012 | Zhang et al. |
| 2015/0012593 A1 | 1/2015 | Philips et al. |
| 2016/0277272 A1 | 9/2016 | Peach et al. |

OTHER PUBLICATIONS

Al-Fares, M., et al., "Hedera: Dynamic Flow Scheduling for Data Center Networks," Proceedings of the 7th USENIX conference on Networked systems design and implementation, Apr. 28-30, 2010, 15 pages.
Chanda, A., et al., "Content Based Traffic Engineering in Software Defined Information Centric Networks," arXiv:1301.7517v1 [cs.NI], IEEE Conference on Computer Communications Workshops, Jan. 31, 2013, 6 pages.
Clegg, R., et al., "A critical look at power law modelling of the Internet," arXiv:0910.2140v1 [cs.NI—Oct. 12, 2009, May 29, 2018, 34 pages.
Curtis, A., et al., "Mahout: Low-Overhead Datacenter Traffic Management Using End-Host-Based Elephant Detection," INFOCOM, Jun. 30, 2011, pp. 1629-1637.
Dai, J.G., et al., "Stability of join-the-shortest-queue networks," Queueing Systems, vol. 57, 2007, pp. 129-145.
Dipalantino, D., et al., "Traffic Engineering vs. Content Distribution: A Game Theoretic Perspective," INFOCOM, Jun. 2, 2009, pp. 540-548.
Fayazbakfish, S., et al., "Less Pain, Most of the Gain: Incrementally Deployable ICN," SIGCOMM, Aug. 12-16, 2013, pp. 147-158.
Fortz, B., et al., "Internet Traffic Engineering by Optimizing OSPF Weights," IEEE INFOCOM, Nineteenth Annual Joint Conference of the IEEE Computer and Communications Societies, Aug. 6, 2000, pp. 519-528.
Gupta, V., et al., "Analysis of Join-the-Shortest-Queue Routing for Web Server Farms," Journal Performance Evaluation, vol. 64, No. 9-12, Oct. 2007, 29 pages.
Hong, C., et al., "Achieving High Utilization with Software-Driven WAN," Proceedings of the ACM SIGCOMM 2013 conference on SIGCOMM, Aug. 12-16, 2013, 15 pages.
Jacobson, V., et al., "Networking Named Content," CoNEXT, Proceedings of the 5th international conference on Emerging networking experiments and technologies, Dec. 1-4, 2009, 12 pages.
Jain, S., et al., "B4: Experience with a Gloally-Deployed Software Defined WAN," Proceedings of the ACM SIGCOMM 2013 conference on SIGCOMM, Aug. 12-16, 2013, 12 pages.
Jiang, W., et al., "Cooperative Content Distribution and Traffic Engineering in an ISP Network," Sigmetrics, Jun. 15-19, 2009, 12 pages.
Lautenschlaeger, W., "A Deterministic TCP Bandwidth Sharing Model," arXiv:1404.4173 [cs.NI], Apr. 16, 2014, 10 pages.
McKeown, N., et al., "OpenFlow: Enabling Innovation in Campus Networks," ACM SIGCOMM Computer Communication Review, vol. 38, No. 2, Apr. 2008, pp. 69-74.
Poese, I., et al., "Enabling Content-aware Traffic Engineering," ACM SIGCOMM Computer Communication Review, vol. 42, No. 5, Oct. 2012, pp. 22-28.
Reed, M., "Traffic engineering for information-centric networks," IEEE ICC 2012, Next-Generation Networking Symposium, Nov. 29, 2012, pp. 2660-2665.
Sharma, A., et al., "Beyond MLU: An Application-Centric Comparison of Traffic Engineering Schemes," Proceedings IEEE INFOCOM, Jun. 30, 2011, pp. 721-729.
Sharma, A., "Distributing Content Simplifies ISP Traffic Engineering," Proceedings of the ACM SIGMETRICS/international conference on Measurement and modeling of computer systems, Jun. 17-21, 2013, 14 pages.
Su, K., et al., "On the Benefit of Information Centric Networks for Traffic Engineering," arXiv:1311.0951 [cs.NI], IEEE ICC 2014, Next-Generation Networking Symposium, 2014, pp. 3178-3184.
Wang, H., et al., "COPE: Traffic Engineering in Dynamic Networks," SIGCOMM, Sep. 11-15, 2006, 12 pages.
Wundsam, A., et al., "Network Troubleshooting with Mirror VNets," IEEE Globecom Workshops, Jan. 24, 2011, 5 pages.
Xie, H., et al., "TECC: Towards Collaborative In-network Caching Guided by Traffic Engineering," 31st Annual IEEE International Conference on Computer Communications: Mini-Conference, 2012, pp. 2546-2550.
Xylomenos, G., et al., "A Survey of Information-Centric Networking Research," IEEE Communications Surveys & Tutorials, vol. 16, No. 2, Second Quarter, 2014, pp. 1024-1049.
Yen, J., "Finding the k-shortest loopless paths in a network. Management Science," Management Science, vol. 17, No. 11, Jul. 1971, pp. 712-716.
Yu, M., et al., "Tradeoffs in CDN Designs for Throughput Oriented Traffic," CoNEXT, Dec. 10-13, 2012, 12 pages.
"Yen's algorithm," Wikipedia, Aug. 6, 2014, 6 pages.
"A Content-Based Traffic Engineering Policy for Information-Centric Networks," 13th IEEE Annual Consumer Communications & Networking Conference, Mar. 31, 2016, 9 pages.
Notice of Allowance dated Sep. 13, 2017, 9 pages, U.S. Appl. No. 14/825,817, filed Aug. 13, 2015.
Office Action dated Mar. 24, 2017, 8 pages, U.S. Appl. No. 14/825,817, filed Aug. 13, 2015.
Office Action dated May 18, 2017, 17 pages, U.S. Appl. No. 14/825,817, filed Aug. 13, 2015.

US 10,673,763 B2

LEARNING OR EMULATION APPROACH TO TRAFFIC ENGINEERING IN INFORMATION-CENTRIC NETWORKS

CROSS-REFERENCE TO RELATED APPLICATIONS

This patent application is a continuation of U.S. patent application Ser. No. 15/843,937 filed Dec. 15, 2017, by Serhat Nazim Avci, et al., and entitled "Learning Or Emulation Approach to Traffic Engineering in Information Centric Networks," which is a divisional of co-pending U.S. patent application Ser. No. 14/825,817, filed Aug. 13, 2015, by Serhat Nazim Avci, et al., and entitled, "A Network Element Configured to Operate in an Information Centric Network," which claims the benefit of U.S. Provisional Patent Application No. 62/040,957 filed Aug. 22, 2014 by Serhat Nazim Avci, et al., and entitled, "Emulation Learning Approach To Traffic Engineering In Information Centric Networks," the teachings and disclosures of which are hereby incorporated in their entireties by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Conventional computer networks are built from a large number of network devices, such as routers, switches, and/or other hardware. Management of a large network can be complex and costly. It is believed that the complexity can be addressed by separating the bundling of control and data forwarding in traditional routers and replacing the use of fully distributed protocols for network control with centralized protocols. For example, data forwarding (e.g., forwarding plane) is decoupled from control decisions (e.g., control plane), such as routing, resources and other management functionalities in a centrally-controlled network. The decoupling also allows the forwarding plane and the control plane to operate on different hardware, in different runtime environments, and/or operate using different models. In the centrally-controlled network, network intelligence is logically centralized in software-based controllers. Thus, network devices become packet forwarding devices that are managed and controlled by the centralized controllers.

SUMMARY

In one embodiment, the disclosure includes a method implemented in a network element (NE) configured to operate in an information centric network (ICN) including receiving a test traffic flow as a copy of a traffic flow in a forwarding plane of the ICN during a defined interval, emulating the ICN at a state determined at an arrival time of the test traffic flow based on an active traffic flow in the ICN, measuring a first impact of a first candidate path for the test traffic flow in the emulated ICN to the active traffic flow, selecting the first candidate path based on the first impact measurement, and constructing a forwarding rule based on the state and the selection of the first candidate path.

In another embodiment, the disclosure includes a computer program product comprising computer executable instructions stored on a non-transitory computer readable medium such that when executed by a processor cause a network element (NE) to receive a plurality of test traffic flow objects, wherein the test traffic flow objects are copies of a subset of traffic flow objects received in a forwarding plane of an information centric network (ICN) during a defined interval, emulate the ICN in a control plane based on a network state of the ICN determined at an arrival time of the test traffic flow objects to the NE and defined based on a plurality of active traffic flow objects in the ICN, determine a plurality of first candidate paths for a first test traffic flow object from the test traffic flow objects, measure a first impact of the first candidate paths on the active traffic flow objects in the emulated ICN, select one of the first candidate paths based on the first impact measurement, determine a plurality of subsequent candidate paths for all remaining test traffic flow objects from the test traffic flow objects subsequent to the first test traffic flow object consecutively, measure a subsequent impact of each of the subsequent candidate paths on the active traffic flow objects and all subsequent test candidates selected, select one of the subsequent candidate paths based on the subsequent impact measurement, and construct a plurality of forwarding rules based on the network state and the candidate paths selections.

In yet another embodiment, the disclosure includes a network element (NE) configured to operate in an information centric network (ICN) including a receiver configured to receive a plurality of test traffic flows, wherein the test traffic flows are copies of a number of traffic flows received in a forwarding plane of the ICN during a defined interval, a memory storing instructions, a processor coupled to the memory, the processor configured to execute the instructions to cause the processor to emulate the ICN at a state determined at an arrival time of the test traffic flows to the NE and defined based on a plurality of active traffic flows in the ICN, measure a first impact of a plurality of first candidate paths for a first test traffic flow from the test traffic flows in the emulated ICN to the active traffic flows, select one of the first candidate paths based on the first impact measurement, measure a second impact of a plurality of second candidate paths for a second test traffic flow from the test traffic flows in the emulated ICN to active traffic flows and the selected first candidate test path, select one of the second candidate paths based on the second impact measurement, and construct a plurality of forwarding rules based on the state and the candidate paths selections.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
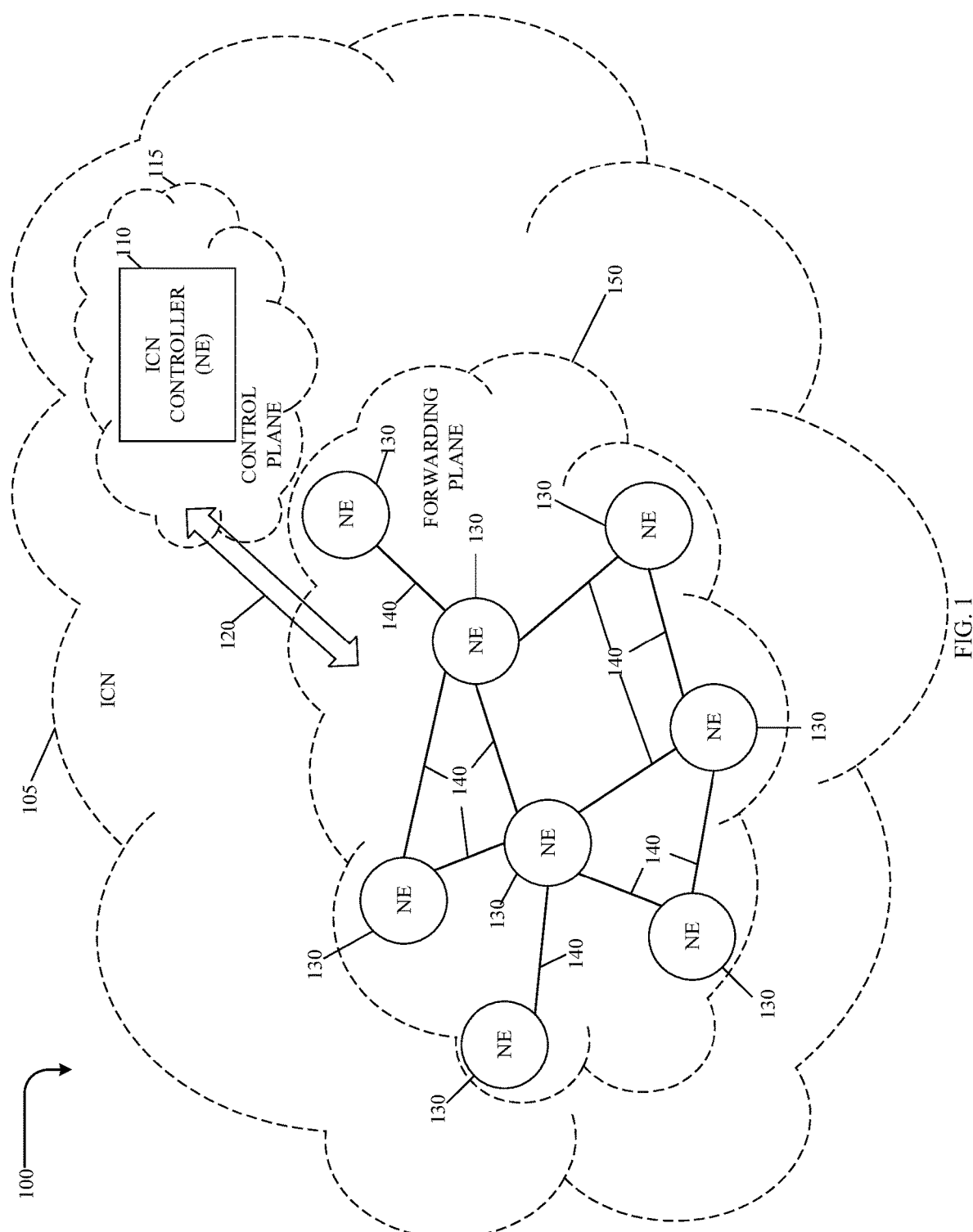
FIG. 1 is a schematic diagram of an embodiment of an architecture of an information centric network (ICN).

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An Information Centric Network (ICN) is a type of network architecture that focuses on information delivery. ICNs may also be known as content-aware, content-centric, or data specific networks. ICNs shift the Internet protocol (IP) communication model from a host-to-host model to an information-object-to-object model. The IP host-to-host model addresses and identifies data by storage location, for example, by host IP address, whereas the information-object-to-object model employs a non-location based addressing scheme that is content-based. The entities that are distributed or operated on in an ICN communication model are information objects. Some examples of information objects may include content, data streams, services, user entities, and/or devices. In an ICN, information objects are assigned with application-based names, which are used to address the information objects, decoupling the information objects from locations. Routing to and from the information objects are based on the assigned names. ICN provisions for in-network caching, where a wide variety of network devices or elements serve as temporary content servers.

In one embodiment, an ICN approach offers proper abstractions to perform a finer grained resource allocation than a traditional Internet Protocol (IP) approach. The abstractions are leveraged to perform content-based traffic engineering (TE). In one exemplary implementation, content-based TE includes assigning resources to each piece of content. A network neutrality principle can be implemented and any one piece or type of content is not prioritized over others. While the description is primarily directed to approaches with a resource allocation scheme that is blind to the type and producer of content, it is appreciated that presented approaches can be readily adapted to adjust performance based upon a variety of considerations (e.g., a provider may want to give better performance to content from a particular type of content, producer of content, etc.).

In one embodiment, a content allocation architecture in an ICN provides the proper functions for content-based resource allocation, and some scheduling policies can take advantage of these functions to achieve a significant gain over conventional IP resource allocation procedures. Network elements (NEs) with in the ICN may be configured to implement the forwarding or data plane functions, while the control plane functions may be provided by an NE configured as an ICN controller. In such a network the data-forwarding capability (e.g., the data or forwarding plane) may be decoupled from the routing, resource, and other management functionality (e.g., the control plane).

Disclosed herein are various mechanisms for a big data approach to TE through an observation of traffic flows (e.g., data packets) and an application of data analysis to build and optimize forwarding rules. As discussed below, incoming traffic flows to an ICN may be copied or sampled and sent to a control plane for analysis as a batch of test traffic flows. During a discovery phase, the ICN controller may receive these sample traffic flows and emulate the forwarding plane of the ICN in the control plane to measure the impact of alterative paths of the sampled traffic flows to active traffic flows in the forwarding plane. Once decisions regarding the alterative path have been made, the ICN controller may then build and optimize forwarding rules based on these chosen paths through a machine learning process. The ICN controller may then push these forwarding rules to the forwarding plane where the ICN may utilize the forwarding rules during an exploitation phase. The two phases, discovery and exploitation, are repeated and occur simultaneously. That is, the forwarding rules built from a prior discovery phase are utilized in the exploitation phase while the ICN controller implements the discovery phase on a new set of sample traffic flows. Thus, the forwarding rules utilized in the exploitation phase are kept current with regard to the state of traffic flows within the ICN.

FIG. 1 is a schematic diagram of an embodiment of an architecture 100 of an ICN 105. The ICN 105 comprises an NE acting as an ICN controller 110 operating in a control plane 115 of the ICN 105 and a plurality of NEs acting as content nodes 130 and/or other NEs, such as content producers and/or content consumers, interconnected by a plurality of links 140 operating in a forwarding plane 150 of the ICN 105. The ICN 105 provides in-network caching, built-in content security, and multi-cast data distributions according to the ICN protocol. The ICN 105 may comprise one or more networking domains that are operated by one or more administrative domains. The links 140 may comprise physical links, such as fiber optic links, electrical links, wireless links, and/or logical links used to transport data in the ICN 105.

The ICN controller 110 may be a device, a virtual machine (VM), a hypervisor, or any other device operating in the control plane 115 and configured to manage and/or control the routing and other management functions for the NEs 130 within the ICN 105. The ICN controller 110 may be any type of network controller, such as a centralized controller or a distributed controller. In an embodiment, the network controller 110 is a software-defined networking (SDN) controller, such as an OpenFlow-enabled controller. In such an embodiment, the forwarding plane 150 is decoupled from the control plane 115, and the ICN controller 110 configures each of the NEs 130 with forwarding rules in the form of, for example, routing tables and/or flow tables. At least a portion of the forwarding plane 150 may be included in an ICN, wherein the ICN includes multiple paths between a source and a destination. Some ICN architectures such as Content Centric Networks (CCN) and/or Named Data Networks (NDN) do not specify a controller, and assume a distributed routing mechanism. However, CCN/NDN includes a strategy layer that selects how to forward interest packets, and if the upstream edge router has some knowledge of the downstream network congestion, this edge router can select the proper path for the data messages, assuming the function of the (now distributed) controller. For simplicity, the description is presented with respect to a centralized ICN controller. The presented approaches can be readily implemented with other controllers.

The ICN may receive a request for content and the content flows back through the ICN once a source of the content is reached. In one exemplary implementation, there is a somewhat restrictive assumption that a content object is mapped to a single flow and that all chunks composing one content object are allocated to the same path through the network. It is appreciated that ICNs support delivery of the chunks from multiple sources. However, in one embodiment, a simplified approach is implemented where all chunks follow the same path.

To obtain a particular content item, a content consumer creates an Interest packet and sends the Interest packet through the ICN 105. The Interest packet is routed through the ICN by the content nodes 130 toward the source of the requested content item based on the content name. When the Interest packet reaches a node within the ICN 105 that has the requested content, Data packets comprising the content are returned back to the consumer through the ICN 105. This flow of packets or traffic flow is returned to the consumer or destination through the ICN based on the forwarding rules created by the ICN controller 110 as the Data packets may not carry any host or interface addresses. The content nodes 130 measure and track fine-grain network information as packets arrived at the content nodes 130. The content nodes 130 provide the fine-grain network information to the ICN controller 110 through a network control interface 120.

In one embodiment, there is not strict path symmetry. In one embodiment, strict path symmetry is enforced and the traffic allocation decision can be made on a request for content. Namely, when the ICN 105 receives a request for content, the path selection can be performed by routing the request to the location hosting the data over the desired return path for the content.

For ease of explanation however, in one example, a content flow enters the ICN 105, either from a host directly attached to the ICN or from a different domain, and the ICN will make a content-based routing decision to deliver the content to the requester.

In one embodiment, it is appreciated the term "flow" by itself can be used interchangeably with content. In one exemplary implementation, the flow or content is defined as the sequence of all chunks or portions of data belonging to a single data object. It is also appreciated that while flow is similar to content, there is a significant difference between IP flow control and content flow control. IP flow control may be difficult to implement because of the issues in obtaining an accurate descriptor of the amount of resources to allocate (e.g., difficult to predict the flow length just by reviewing the network layer information in the packet header, etc.).

The ICN controller 110 may be physically or logically located within the ICN 105. In an embodiment, the ICN controller 110 may be a centralized logical entity distributed across one or more NEs. In another embodiment, the ICN controller 110 may be implemented as a network control module within a VM. It should be noted the ICN controller 110 may be coupled to any of the NEs 130 in the ICN 105.

The ICN controller 110 performs a variety of network control functions according to the application-specific objectives. Some examples of network control functions may include, but are not limited to, generating and maintaining network topologies, identifying application flows, determining routes through the ICN 105, and managing network resources and network state information. The ICN controller 110 may not perform data plane functions, such as forwarding data traffic to a selected destination. Moreover, the ICN controller 110 may be able to produce forwarding rules that define how incoming packets are routed within the ICN 105. In one embodiment, the ICN controller 110 may be integrated within a network operating system.

As part of the control plane 115 functionality, the ICN controller 110 may be configured to collect fine-grain network information from network nodes 130 through the network control interface 120. Fine-grain network information may pertain to any of the information within the ICN 105, which may include, but are not limited to, the ICN domain topology, link capacity within the ICN 105, available bandwidth on each link within the ICN 105, and status of links that belong to the ICN 105 but are connected to the NEs 130 and/or network nodes external to the ICN 105. Additionally, the fine-grain network information may be application-specific statistics, such as content popularity, or provider-specific, such as content provider popularity. Content popularity refers to the number of requests for a particular content item received from content consumers. Content provider popularity refers to the number of content consumers that download content via a particular content provider.

In one exemplary implementation, the control plane 115 extends to the edge of the ICN 105 and is able to make routing decisions for each traffic flow. The decision can include assigning a tag (e.g., such as a Multiprotocol Label Switching label, etc.) at the ingress edge, so that the flow follows a given path through the network fabric until it reaches the egress edge.

To deliver content through the forwarding plane 150 of the ICN 105, the ICN controller 110 may generate and optimize forwarding rules by emulating one or more candidate paths for traffic flows through the ICN 105 and may identify controls based on any application, content, or domain specific objectives, such as median completion times for traffic flows or the amount of network congestion. Some examples of controls may include security verifications and enforcements, context adaptations, content caching, policy enforcements, etc. After identifying and optimizing the forwarding rules, the ICN controller 110 may generate one or more flow entries based on the forwarding rules and add the flow entry to each of the content nodes 130 along a forwarding path, for example, by sending the flow entry/entries in a flow configuration message via a network control interface 120. The network control interface 120 supports communication between the ICN controller 110 and the content nodes 130 and may employ a communication protocol and/or extend a communication protocol, such as the OpenFlow protocol.

The ICN controller 110 builds and maintains a global network topology view of the ICN 105 based on the forwarding rules identified in the ICN 105, where the global network topology view is an abstracted view of the underlying infrastructure of the ICN 105. For example, the global network topology view may include network resources, (e.g., bandwidth usage, bandwidth availability, and/or latencies), network statistics, and/or application statistics in addition to network connectivity information (e.g., interconnecting NEs and/or links). The ICN controller 110 may utilize the topology view and a state of active traffic flows in the forwarding plane at a given time to emulate the ICN 105 in the control plane 115.

The ICN controller 110 may utilize the emulated ICN to build a set of forwarding rules based on data collected during a discovery phase. The discovery phase comprises a training part, where candidate paths for received test traffic flows are tested in the emulated network, and a learning part, where the set of forwarding rules are built base on the results of the training part. The set of forwarding rules may be utilized by the ICN controller 110 to select paths through the ICN 105 for traffic flows received in the forwarding plane 150 in an exploitation phase.

The content nodes 130 may be any physical devices, such as routers and/or network switches, or logical devices configured to perform switching functions in the ICN 105 as directed by the ICN controller 110. In the exploitation phase, the switching functions include forwarding incoming Interest packets based on entries in a Forwarding Information Base (FIB), applying the forwarding rules, determined during the discovery phase, to the incoming packets, measuring statistics, and monitoring context changes.

The content nodes 130 receive pathing decisions based on forwarding rules from the ICN controller 110. For example, the content nodes 130 create/update entries in the FIB based on the received pathing decisions. The FIB entries stores content name prefixes and corresponding outbound port(s) coupled to a next hop within the ICN toward a corresponding content producer.

Figure 2:
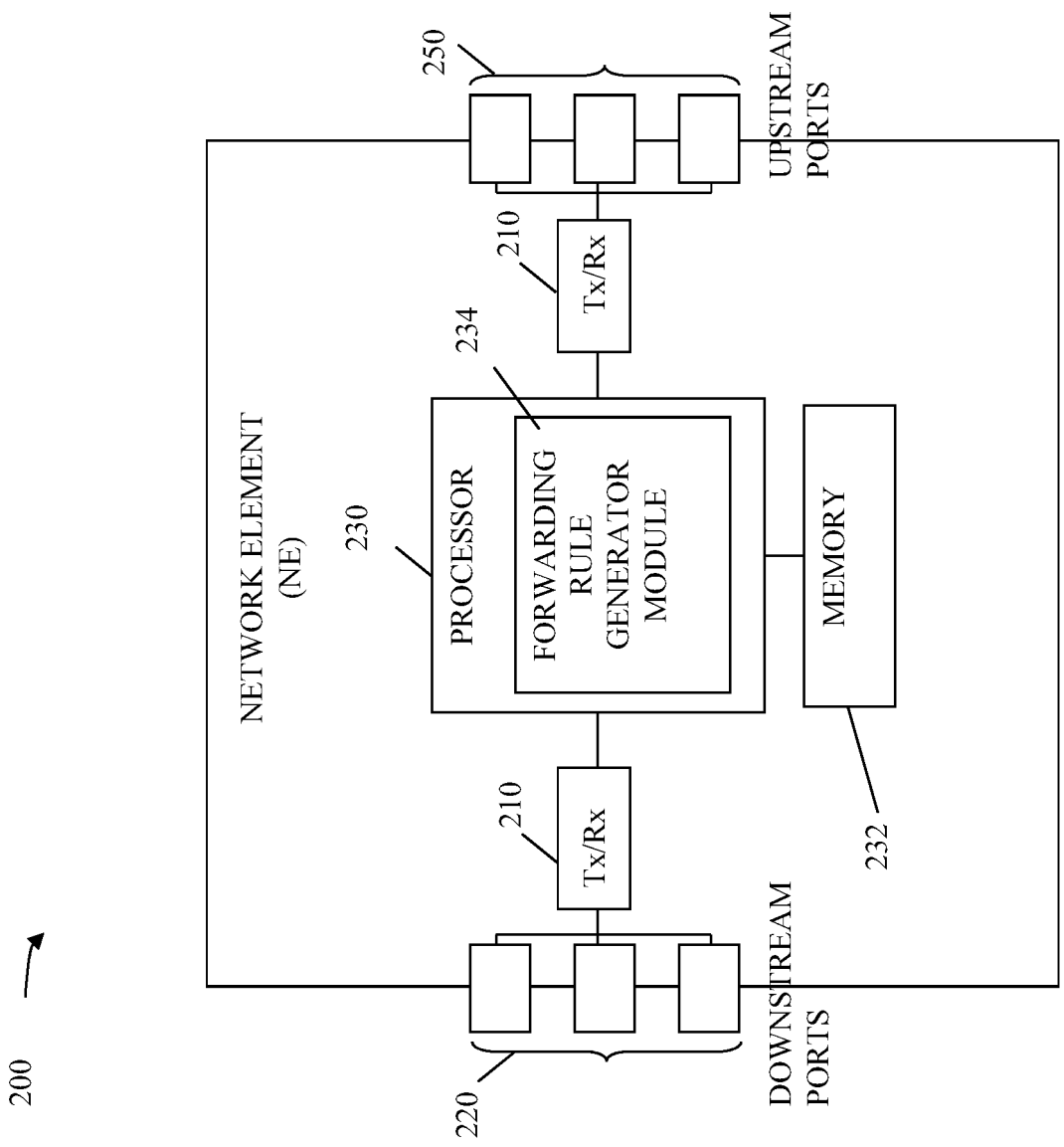
FIG. 2 is a schematic diagram of an embodiment of an NE within an ICN.

FIG. 2 is a schematic diagram of an embodiment of an NE 200 within an ICN, such as ICN 105. NE 200 may be any component configured to act as an ICN controller, such as ICN controller 110 and/or content nodes, such as NEs 130. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments.

At least some of the features/methods described in the disclosure are implemented in a network apparatus or component such as an NE 200, such as ICN controller 110 or content nodes 130. For instance, the features/methods in the disclosure may be implemented using hardware, firmware, and/or software installed to run on hardware. The NE 200 is any device that transports packets through a network (e.g., a switch, router, bridge, server, a client, etc).

As shown in FIG. 2, the NE 200 may comprise transceivers (Tx/Rx) 210, which are transmitters, receivers, or combinations thereof. A Tx/Rx 210 is coupled to a plurality of downstream ports 220 (e.g., downstream interfaces) for transmitting and/or receiving packets from other nodes and a Tx/Rx 210 coupled to a plurality of upstream ports 250 (e.g., upstream interfaces) for transmitting and/or receiving packets from other nodes, respectively. A processor 230 is coupled to the Tx/Rxs 210 to process the packets and/or determine which nodes to send packets to. The processor 230 may comprise one or more multi-core processors and/or memory 232 devices, which function as data stores, buffers, Random Access Memory (RAM), Read Only Memory (ROM), etc. Processor 230 may be implemented as a general processor or may be part of one or more application specific integrated circuits (ASICs) and/or digital signal processors (DSPs). Processor 230 comprises a Forwarding Rule Generator Module 234, which implements at least some of the methods discussed herein such methods 700, 800, and/or 900 described below. In an alternative embodiment, Forwarding Rule Generator Module 234 is implemented as instructions stored in memory 232, which are executed by processor 230, or implemented in part in the processor 230 and in part in the memory 232, for example a computer program product stored in a non-transitory memory that comprises instructions that are implemented by the processor 230. In another alternative embodiment, the Forwarding Rule Generator Module 234 is implemented on separate NEs. The downstream ports 220 and/or upstream ports 250 may contain electrical and/or optical transmitting and/or receiving components.

It is understood that by programming and/or loading executable instructions onto the NE 200, at least one of the processor 230, Forwarding Rule Generator Module 234, Tx/Rxs 210, memory 232, downstream ports 220, and/or upstream ports 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design is developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
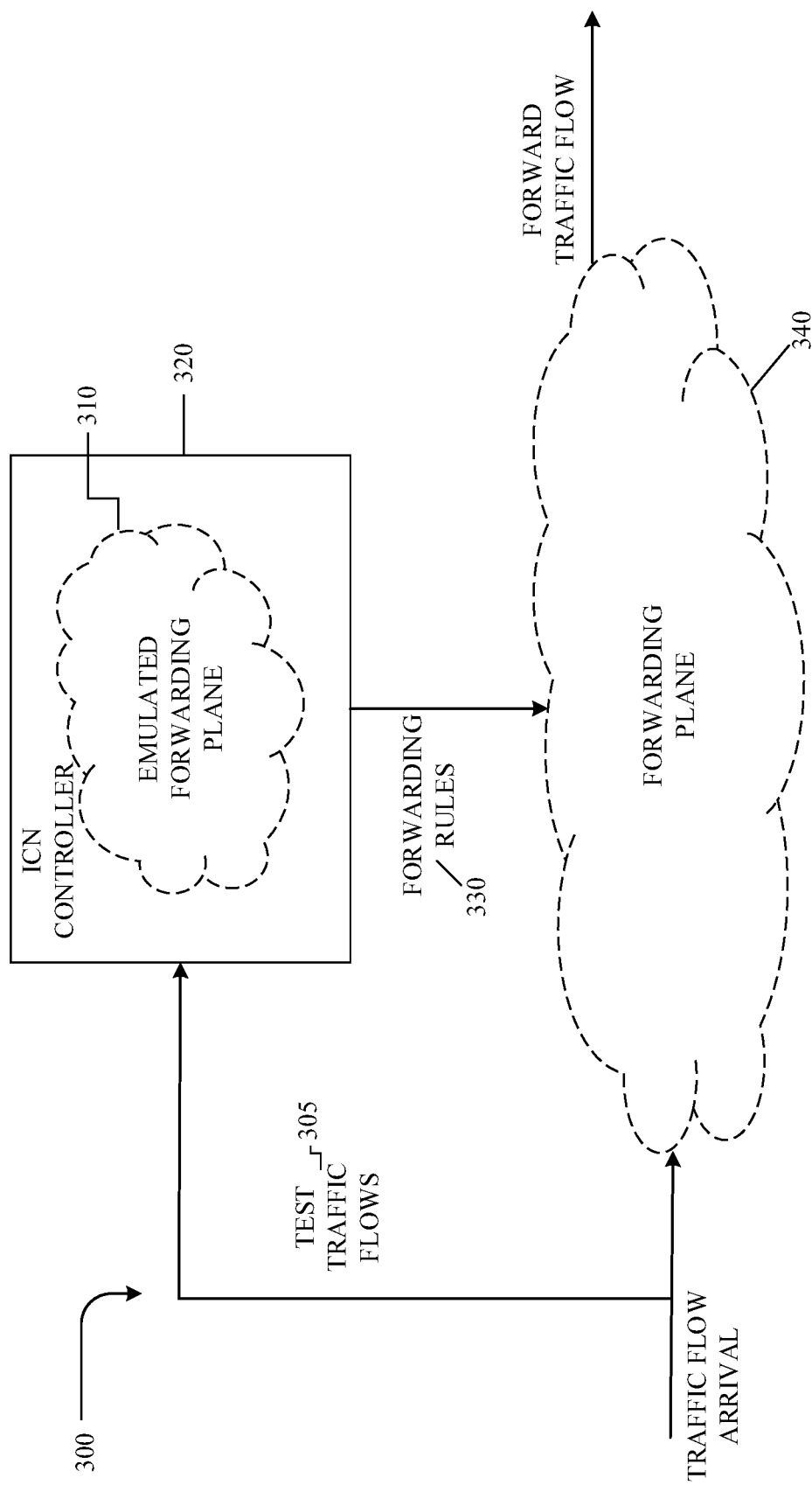
FIG. 3 illustrates an exemplary embodiment of an ICN configured to receive traffic flows and to forward the traffic flows on the forwarding plane of the ICN and to duplicate the traffic flows and send as test traffic flows to an NE configured to act as the ICN controller in the ICN.

FIG. 3 illustrates an exemplary embodiment 300 of an ICN, such as ICN 105, configured to receive traffic flows and to forward the traffic flows on the forwarding plane 340, such as forwarding plane 150, of the ICN. The embodiment 300 is further configured to duplicate and send the received traffic flows as test traffic flows 305 to an NE configured to act as an ICN controller 320, such as ICN controller 110, in the ICN. The ICN controller 320 is configured utilized forwarding rules 330 when making determinations regarding paths through the ICN for traffic flows on the forwarding plane 340 of the ICN. For example, traffic flows are received and forward on the forwarding plane 340 within an ICN network based on forwarding rules generated from a previous discovery phase. The ICN controller 320 receives the test traffic flows and emulates the forwarding plane 340 of the ICN in the control plane as an emulated forwarding plane 310. Emulated forwarding plane 310 is emulated based on a state of the forwarding plane 340 at the arrival time of the test traffic flows of a portion of or all active traffic flows within the ICN. For each of the received test traffic flows, the ICN controller 320 may determine the source and destination, the size of the content object flow, and a number of candidate paths through the ICN. For each candidate path, the ICN controller 320 determines metrics, such as completion time, for the traffic flow and measures the impact to the completion time of the other traffic flows active in the network. The ICN controller 320 then selects and records one of the candidate paths based on selection criteria in a test path list. In various embodiments, the selection criteria are determined by a configuration of the ICN controller 320. In an embodiment, the selection criteria comprise an effect of the paths to traffic completing time, network congestion, and data packet size or types within the traffic flow. The ICN controller 320 builds and optimizes a new set of forwarding rules 330 based on the selected paths and distributes network pathing information to the NEs within the ICN based on the new set of forwarding rules 330. The NEs then utilize received network pathing information to forward any traffic flows on the forwarding plane received subsequent to the distribution of the forwarding rules 330.

Figure 4:
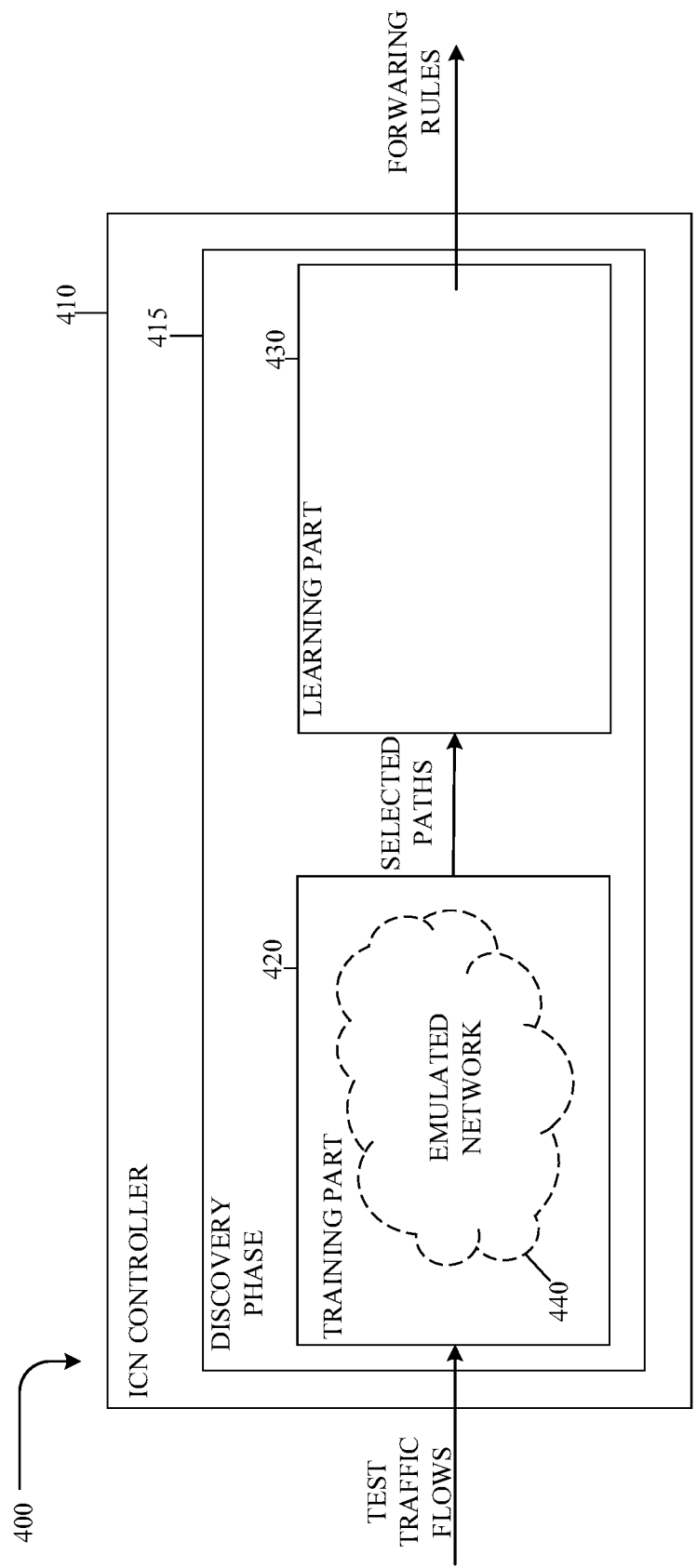
FIG. 4 illustrates an exemplary embodiment of a discovery phase implemented on an ICN Controller configured to receive test traffic flows and build forwarding rules in an ICN.

FIG. 4 illustrates an exemplary embodiment 400 of a discovery phase 415 implemented on an ICN controller 410, such as ICN controller 110, configured to receive test traffic flows, such as test traffic flows 305, and build forwarding rules, such as forwarding rules 330, in an ICN, such as ICN 105. The ICN controller 410 receives a batch of sample traffic flows distributed on the forwarding plane of the ICN as test traffic flows. The ICN controller 410 then conducts a training part 420 of the discovery phase 415 to determine the impact of pathing decision regarding the test traffic flows on a set of active traffic flows in the ICN and on any determined paths for previously considered test traffic flows. In various embodiments, the set of active traffic flows is a subset of all active traffic flows in the ICN. In other embodiments, the set of active traffic flows includes all active traffic flows in the ICN. During the training part 420, the ICN controller 410 emulates the forwarding plane of the ICN (emulated network 440) based on a current state of the ICN at the time the test traffic flows are received. The current state sets an initial condition for the emulated network 440 based on the forwarding rules employed on the forwarding plane of the ICN for the set active traffic flows. For each test traffic flow, the ICN controller 410 determines a set of candidate paths in emulated network 440 and determines and records decisions regarding the candidate paths for the test traffic flow. In various embodiments, the ICN controller 410, determines and records optimal path decisions, where the path is a means through the ICN from a source and to a destination of each traffic flow. The path decisions are made sequentially. In one embodiment, the ICN controller considers the paths for one test traffic flow at a time. In another one embodiment, the ICN controller considers the paths for each test traffic flow at a time running in parallel. Decisions regarding each subsequently considered traffic flow measure the impact of the determined candidate paths on both the set of active traffic flows (current state of the network) and any determined path decisions for previously considered test traffic flows (e.g., the test traffic flows are considered in a linear fashion).

In other embodiments, optimal pathing decisions are determined based on the consideration of the entire set of possible paths for the set of test traffic flows in the emulated network 440 computed simultaneously (e.g., the entire set of test traffic flows is optimized as a group). In these embodiments, the test traffic flows may be received before the traffic flows from which they are copied are forwarded on the forwarding plane. Thus, the computed optimal decision may be utilized to build forwarding rules that predict a future state of the network. In these embodiments, the forwarding rules are then utilized by the ICN controller 410 to distribute pathing information regarding traffic flows in the forwarding plane.

Many mechanisms can be used to create a mapping of the content name received in a traffic flow to its size. In one embodiment, an implementation can be represented by a graph $G=(V, E)$ with V representing the set of nodes and E the set of links. Each link e has capacity $c_e$. Each content (or flow) $z_{s,d}$ entering the network at vertex s and leaving at vertex d can select a path from a set of $K_{s,d}$ distinct paths ($P_{s,d}^k$, k=1, ..., $K_{s,d}$), where a path is an acyclic sequence of links in E going from s to d. If link e belongs to path $P_{s,d}^k$, for some s, d, k, then $e \in P_{s,d}^k$. In one exemplary implementation, $K_{s,d}$ is relatively low to simplify the allocation decision and the management complexity. In one exemplary evaluation, $K_{s,d}$ is equal to 3.

In one embodiment, according to classical networking models, various possible flows from s to d can be generated according to a Poisson process with rate $\lambda_{s,d}$. The classical networking models by themselves do not provide proper abstractions to perform finer grained resource allocation (e.g., where abstractions are leveraged to perform content-based TE). Since each flow corresponds to a piece of content, and since the network has access to the content size, upon arrival of a flow f in the network, the network has access to the flow size (which is also denoted by z). The size z can be drawn from a known distribution with mean $\bar{z}$. In one exemplary evaluation, the content size is considered to be Pareto distributed. The amount of traffic is under the arrival rate $\lambda_{s,d}$ and the distribution for z is stable and can be allocated to paths $P_{s,d}^k$, in a manner such that the load allocated to each link is less (on average) than this link's capacity. In one exemplary implementation, there exist coefficients $\pi_{s,d}^k$, 1, ..., $K_{s,d}$ with $0 \leq \pi_{s,d}^k \leq 1$ and $\pi_{s,d}^k=1$, such that the link utilization use of link $u_e$ satisfies the following:

$$\forall e \in E, u_e = \sum_{P_{s,d}^k : e \in P_{s,d}^k} \lambda_{s,d} \pi_{s,d}^k \bar{z} < C_e. \qquad \text{(Equation 1)}$$

Note that the matrix $\{\bar{z} \cdot \lambda_{s,d}\}(s,d) \in V \times V$ corresponds to the traffic matrix in the network, and the $\pi_{s,d}^k$ corresponds to a static traffic engineering decision. For instance, a candidate TE policy could be to randomly split the flows arriving from s to d with probability $\pi_{s,d}^k$ onto the $K_{s,d}$ possible paths $P_{s,d}^k$. In one embodiment, minMLU denotes the random splitting policy where the choice of coefficient $\pi_{s,d}^k$ minimizes$\max_{e \in E} u_e$. In one example, this is the typical minMLU traffic engineering policy which minimizes the Maximum Link Utilization.

In one embodiment, one important aspect is that the path of the objects through the network is modified, but not the amount of traffic that is offered to the network. Therefore, if there is a solution to Equation 1, the network will be stable (e.g., able to deliver all the traffic, etc.) and the link utilization of all policies which keep the network stable will be the same. In one exemplary implementation, the goal is not to improve link utilization, but to reduce the delay in delivering a flow (or equivalently, by Little's Theorem, the number of flows in progress at any given time).

In one embodiment, another key aspect is the number of flows being considered at a given time. For an extremely large amount of flows, the probabilistic splitting of the flows according to the $\pi_{s,d}^k$ will yield a result which converges to Equation 1 by the central limit theorem. In one exemplary implementation, this means that the link utilization in such case will be close to optimal. Further, for a very large amount of flows, the resource allocation can be minimized to keep up with the speed. However, in one embodiment, for smaller scales and with heavy tail flow size distribution, the probabilistic resource allocation will have worse results (as can be seen in Evaluation 1). Therefore, in one exemplary implementation, it is restricted to networks at the edge, and ignore core of the network, where in one example minMLU may perform fine.

In one embodiment, the response time of the network for flow z can be defined as the time between the first arrival of the first chunk of z at the ingress of the network until the last departure from the last chunk of flow z at the egress of the network.

An approach in one embodiment satisfies several traffic engineering requirements, including a content based abstraction, a content based control plane, estimation of traffic and scalability. Traditional networks fall short of enabling this vision. IP flows are difficult to properly define, since a sequence of packets matching an IP header filter with no interruption longer than a given time-out can incorporate multiple distinct content, applications, or even users. These difficulties can be overcome by the new inventive approaches presented herein.

In one exemplary implementation, content-based abstraction is implemented in order to perform a fine grained resource allocation where the network layer is able to uniquely identify each flow and is able to distinguish different content and users. As a new flow enters the network, a rule is applied that is set by the controller.

In one embodiment, the control plane is also aware of the congestion in the network fabric to make a proper path selection. In one exemplary implementation, a network monitoring infrastructure keeps track of the amount of traffic allocated to the nodes' outgoing links. Namely, when a flow $z_{s,d}$ with size z is allocated to the k-th path $P_{s,d}^k$, it will add z to the backlog of the edges traversed by path $P_{s,d}^k$, and for the nodes monitoring the congestion, a description of the flows and remaining backlogs is used.

In one embodiment, a described requirement can be considered a strong requirement and is made to demonstrate the potential of the mechanism to reduce the response time of the network. In one exemplary implementation the requirement can be relaxed. However, in one embodiment, from the knowledge of the flows assigned to the paths, the traffic assignment mechanism must be able to derive some behavior of the forwarding plane.

In one embodiment, an estimation of traffic is performed as the control plane needs to be aware of the behavior of the forwarding plane under given flow conditions. Transmission Control Protocol (TCP) is an end-to-end protocol, which makes the forwarding behavior inside the network (say, reaction to congestion) contingent to a policy at the end points. In order to properly assign resource, the control plane would need to understand the impact of its decisions on the flows and have a model of the TCP behavior.

In one embodiment, scalability is implemented and resource allocation policies can scale up with the size of the network. As previously indicated, for large scales, a probabilistic approach can approach the optimal. In one embodiment, two tiers of policy are utilized. In one tier a probabilistic minMLU mechanism in the core is utilized, and in another tier a dynamic allocation from the edge to the core is utilized.

In one embodiment, the example resource allocation architecture includes several software switches configured in a network fabric of a forwarding plane. Content arrives and is forwarded in to the control plane and to a forwarding plane. It is appreciated a software switch can be communicatively coupled to a plurality of other software switches.

In one exemplary implementation, an ICN protocol names the object, so that a content is uniquely identified by its name. This can satisfy a content-based abstraction requirement. In one embodiment, a logically centralized controller makes content-based decisions at the edge of the network. This can include a software switch connected to the controller. A Content Management function can perform the following tasks: map the content to a location, (e.g., in a cache in the network, to an egress path out of the network, etc.); also monitor content information (e.g., such as identifying the content size and keeping a database of the mapping of the content to its size, etc.). A Network Monitoring function can maintain a view of the conditions inside the network (e.g., by polling the switches for network conditions, by estimating the conditions from the input and the predicted network evolution, combination of both, etc.).

In one embodiment, based upon the input of the Content Management and Network Monitoring functions, an allocation algorithm can decide which of the candidate paths for a (source, destination) pair provides a likelihood of good or best network performance. This controller can be extended as an extension of OpenFlow. The mapping of the content name to its size is straightforward in ICNs.

In one embodiment, an allocation algorithm is utilized. In one exemplary implementation, $z_i$ denotes the $i^{th}$ content to be transferred in the network, as well as its size in bytes. A backlog function $B_{z_i}(t)$ can be associated with each point-to-point content transfer from the source $s \in S$ to the destination $d \in D$. The backlog function $B_{z_i}(t)$ denotes the backlog generated by the content $z_i$ from s to d at time t. Letting $t_{z_i}$ be the arrival time of content $z_i$, then $B_{z_i}(t)$ is a non-increasing function of t for $t \in [t_{z_i}, +\infty)$: it diminishes from the size of the content $z_i$ down to 0. For instance, if a flow using the full capacity c of a link is considered, then $B_{z_i}(t)$ can be given as following:

$$B_{z_i}(t) = [z_i - c(t - t_{z_i})]^+ \qquad \text{(Equation 2)}$$

where $[g]^+ = \max\{g, 0\}$. In general, due to the dynamics of the flow interactions and of the transport protocol (say, TCP in IP, or an interest-shaping mechanism in CCN/NDN), it is easier to compute $B_{z_i}(t)$ at each link by subtracting the volume of content that has traversed the link from the original content size. $B_{z_i}(t)$ corresponding to the unfinished, remaining amount for the flow $z_i$. Note that this backlog is not inside the network, but rather corresponds to the amount of data which has not transmitted through the network yet for a specific object.

In one embodiment, the bandwidth sharing function is given and the bandwidth sharing function allocates $f(z_i)$ units of bandwidth to object $z_i$ per unit of time. For instance, if TCP is the transport protocol, $f(z_i)$ can be viewed as the rate achieved by the TCP session which carries $z_i$.

In one exemplary implementation, given $f$ and $B_{z_i}$ for all $i=1, \ldots, n-1$ (where the $n^{th}$ arrival to be scheduled is considered), the completion time for all files can be estimated. It is an iterative process which looks at the next file to terminate, namely the object j such that $B_{z_j}/f(z_j) \leq B_{z_i}/f(z_i)$ for all $i=1, \ldots, n-1$. Upon completion of $z_j$, there can be a different set of objects. In one embodiment, the different set of objects includes all the objects for which $B_{z_i} > 0$ minus $z_j$. Iteration can be performed on the objects, such that $B_{z_i} > 0$ to calculate the completion time of each object. $T_V(z_i)$ can be used to denote the completion time of $z_i$ under the allocation set V describing the path allocation of the objects $z_1, \ldots, z_n-1$.

In one embodiment, for arrival $z_n$, there is a subset $P_{s,d}$ of all the paths between source s and destination d that $z_n$ is assigned to. The cardinality of the candidate path subset can be denoted by $K_{s,d}$, and the allocation set that describes the current allocation plus the potential allocation of $z_n$ to the $i^{th}$ path $P_i \in P_{s,d}$ can be denoted by $V_{P_i}$, $i=1, \ldots, K_{s,d}$. For instance, $V_{P_1}$ is the allocation of $z_1, \ldots, z_{n-1}$ to their current path with backlog $B_{z_i}$ and of $z_n$ to the first path in $P_{s,d}$ with backlog (or in this case, object size) $B(z_n)$.

In one embodiment, a Minimum Response Time Policy algorithm is implemented. A Minimum Response Time Policy algorithm (hereinafter Algorithm 1) can include the following: 1) require: $P_{s,d}$ for each (s,d) traffic demand pair and $B_{z_i}(t)$ for every content $z_i$ being transferred, $i=1, \ldots, n-1$ with $B_{z_i}(t) > 0$: 1), select one path $P \in P_{s,d}$, $1 \le i \le K_{s,d}$ from the candidate paths set and insert it to the allocation set by $V \rightarrow V+z_n \Rightarrow P$; 2) given the bandwidth function f and remaining back-logs $B_{z_i}$, calculate the expected response time $T_V(z_i)$ of each flow. Find the checkpoint time $t_{check}$ which is the minimum expected response time found by $t_{check} = \min_i T_V(z_i)$; update the backlogs of each flow at time $t_{check}$ by: $B_{z_i} = (B_{z_i} - t_{check} \times f(z))^+$; 3) if all flows are completely transmitted then go to next step; otherwise, recursively go back to step 2 and calculate the response time of the non-terminated flows after the checkpoint; update the response time of the flows by $T_V(z_i) = T_V(z_i) + t_{check}$ where $T_V(z_i)$ is the aggregate response time of flow $z_i$ for candidate allocation V; 4) calculate the total response time of all flow as $T_V = \Sigma_{i=1}^n T_V(z_i)$; 5) iteratively go back to step 1 and select the next candidate path until all candidate paths are selected in series; 6) given the total response times of each candidate path scenario $T_V$'s, select the one which will give the minimum total response time; add this path to the existing set of paths.

In one embodiment, the approach is directed to finding the path $P \in P_{s,d}$ such that:

$$\underset{P \in P_{s,d}}{\text{minimize}} \sum_{i=1}^n T_V(z_i) \qquad \text{(Equation 3)}$$

that is, to find the path with the minimal total completion time for all objects in the system. In one embodiment, to keep this policy tractable, subsequently in simulations, $P_{s,d} = \{P_{s,d}^k, k=1, \ldots, K_{s,d}\}$ is specifically considered as the set of $K_{s,d}$ shortest paths given by the output of Yen's k-shortest path algorithm modified to increase path diversity.

In one embodiment, a new inventive approach algorithm is denoted by Minimum Response Time Policy (MRTP), for path selection for incoming content $z_n$, originated at node s and destined for node d, (e.g., as summarized in Algorithm 1).

In one embodiment, Algorithm 1 requires knowledge of the backlogs $B_{z_i}$ and the bandwidth sharing function $f(z_i)$. In one exemplary implementation, the backlog can be monitored at the edge, or can be computed if the function $f(z_i)$ is known at all time. The function $f(z_i)$, $\forall i$, can be estimated from a model of the transport layer or from an empirical measurement of the network conditions. In most systems, it is quite complex to estimate $f(z_i)$ as the dynamics of the system are very intricate. Therefore, the MRTP policy with perfect knowledge of $f(\cdot)$ can be considered an idealized policy.

It is appreciated that presented new approaches to a scheduling policy can be realized in practice. In one embodiment, a policy functions in two phases: a training phase, where the network acquires the path decision based upon an off-line learning; and an exploitation phase, where the policy discovered in the training phase is implemented. In one exemplary implementation, the two phases alternate periodically, so as to keep the decisions in the exploitation phase up to date.

In one embodiment, the learning phase requires knowing the best decision. In one embodiment, a mirror VNet or a network emulation environment that takes as input the packet arrivals into the real network is used, and then computes the completion times of the existing flow for each possible path selection to learn the MRTP decision. Therefore, the forwarding happens in the data plane according to the existing policy (say, the decisions learned during the previous training phase) while the resource allocation mechanism acquires the policy for the next exploitation phase.

In one exemplary embodiment, an iterative optimal path selection algorithm is used for the training period. The following includes operations of an exemplary iterative optimal path selection algorithm for this embodiment: 1) first flow $f1$ with source s and destination d is added to an active traffic input set I. A first candidate path $p = P_{s,d}^1$ of $f_1$ is selected; 2) the emulator is run and an actual mean response time $T_V^1$ of this simulation is determined; in one embodiment, the emulator is an NS-2 emulator; 3) the next p in the set $P_{s,d}$ is selected and the process returns to item 2; 4) the index of the smallest element $r_1$ of the set $\{T_V^1, T_V^2, T_V^3\}$ is determined and stored as the optimal path selection of flow f1; 5) the resulting optimal path selection $r_1$ is added to set the PS; 6) the next flow is added to the active traffic input set I; 7) except the last element of I, the paths of the flows from P S are selected; 8) items 2 through 5 are repeated to learn the optimal path selection of the last element of I instead of $f1$; 9) the process returns to item 6 until the size of set I is equal to the predefined size of the training set.

Once decisions have been made regarding the candidate paths for each of the test traffic flows, the ICN controller 410 begins the learning part 430 of the discovery phase 415. During the learning part 430, the impact of possible allocation policies on the test traffic flows and the current traffic flows in the ICN are examined through a series of machine learning processes.

In an exemplary implementation, after the optimal path selection of the flows in the training set is found, this knowledge is used to derive the path selection policy for future flows. In this embodiment the machine learning process may be described as 1) for each source-destination pair, extract the path selection statistics; 2) for a specific source-destination pair, if an index is dominantly popular, select that index for the future traffic flows of that source-destination pair; 3) for a specific source-destination pair, if more than one index is closely seen in the test traffic flows, make a random selection by taking the weights of paths as their popularity in the test traffic flows; 4) for a specific source-destination pair, if the sample size in the training set is 0, use Multi-topology Recovery Protocol (MTRP) for future traffic flows of that kind.

Forwarding rules for the ICN are created and optimized in the learning part. These forwarding rules are therefore based on tested candidate paths for received traffic flows and an aggregated number of path calculations in the emulated network.

As an example, the forwarding rules may determine a path on the forwarding plane for a received traffic flow based on a percentage of path utilization for the given traffic flow. In this example, the forwarding rules determine a percentage of traffic for each traffic flow to be forwarded on a determined path (e.g., 50 percent of traffic on path A, 40 percent of path B, and 10 percent on path C). As another example, the forwarding rules may determine a dedicated path for each traffic flow (e.g., all packets forwarded along path A) or may determine a path based on an object type or object size contained in the traffic flow. In yet another example, the paths for a traffic flow may be selected based on content type or a type of service. In another example, the forwarding rules may determine a path based on the congestion level of the network. In this example, during periods of high congestion a certain path may be selected for a given traffic flow but during periods of low congestion a different path may be selected for the given traffic flow. In another embodiment, the NEs my utilize the forwarding rules based on a confidence level of each forwarding rule. In this embodiment, the forwarding rules that are determined through a high number of test flows from a certain source and to a certain destination may be given more weight when determining a forwarding path in the forwarding plane of the ICN. In this embodiment, other forwarding rules determined through a low number of test flows may be given less weight when determining a forwarding path in the forwarding plane of the ICN. Once the forwarding rules have been optimized, ICN controller 410 then utilizes forwarding rules to determine pathing decisions regarding traffic flows in the forwarding plane.

Figure 5:
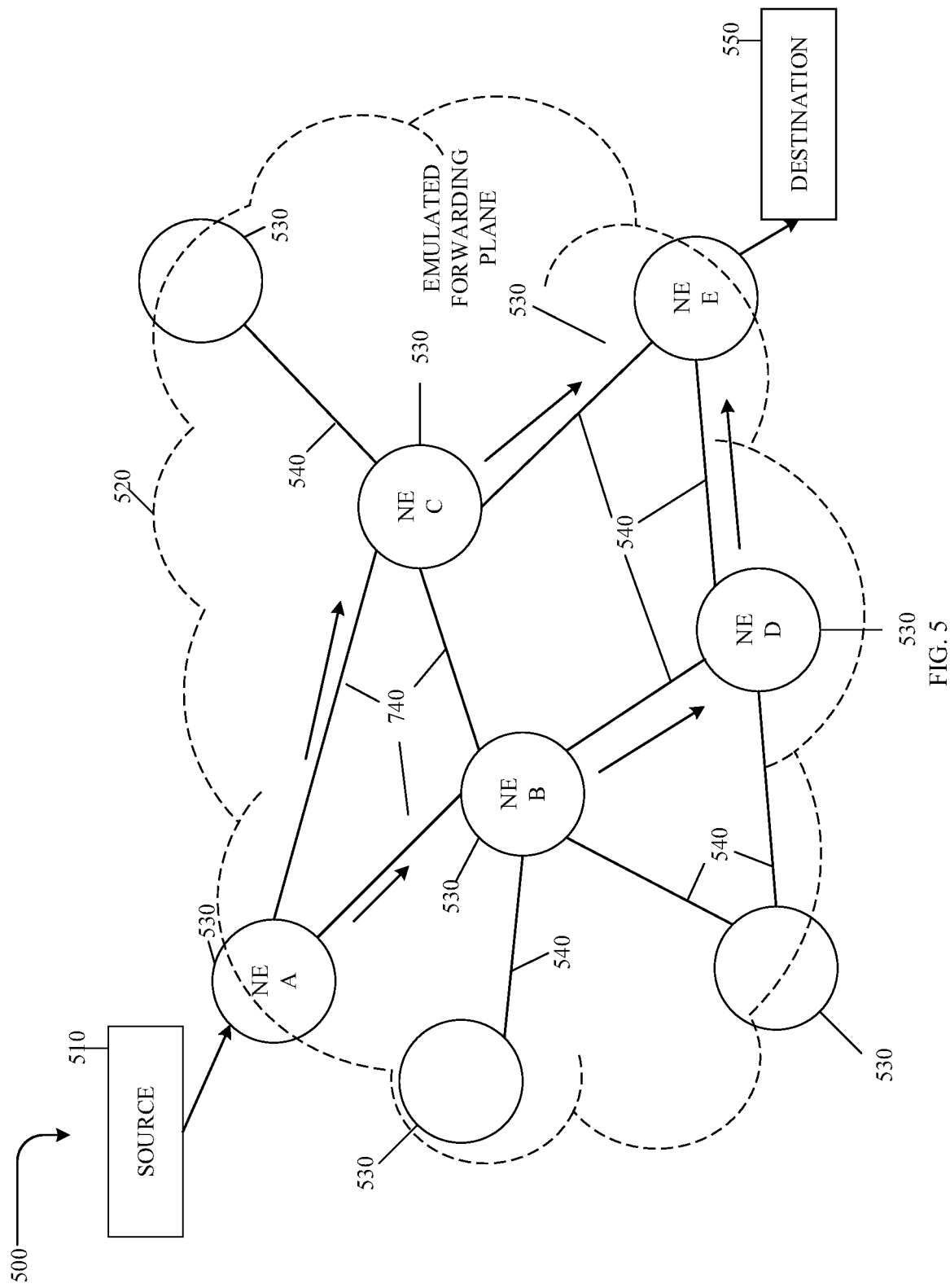
FIG. 5 is a schematic diagram of an embodiment of an emulated forwarding plane which is emulated in a control plane of an ICN by an ICN controller.

FIG. 5 is a schematic diagram of an embodiment 500 of an emulated forwarding plane (emulated network) 520, such as emulated forwarding plane 310, which is emulated in a control plane, such as control plane 115, of an ICN, such as ICN 105, by an ICN controller, such as ICN controller 110. The emulated network 520 may be utilized in a training part, such as training part 420, conducted in the ICN controller. The embodiment 500 comprises an emulated network 520 that connects a source 510 to a destination 550 for a given test flow, such as test traffic flows 305. The source 510 may represent any device configured to generate data. The destination 550 may represent any device configured to consume data. The emulated network 520 may represent any types of network, such as an electrical network and/or an optical network. The emulated network 520 may represent a network utilizing any network communication protocols, such as TCP/IP. The emulated network 520 is configured to provide multiple paths (e.g., redundant links) for emulating the routing data flows in the emulated network 520. As shown, the emulated network 520 comprises a plurality of NEs 530 (e.g., NE A, NE B, NE C, NE D, and NE E) interconnected by a plurality of links 540, which represent physical connections. The links 540 may represent electrical links and/or optical links. The NEs 530 may represent any devices, such as routers, switches, and/or bridges, configured to forward data.

A traffic flow originating from the source 510 may be emulated in the control plane by an ICN controller. The traffic flow from the source 510 may enter the emulated network 520 via the NE A 530 and reach the destination 550 via the NEs B 530 and D 530 or via NE C 530. As shown, the emulated network 520 provides multiple paths for the NE A 530 to forward the received data packet toward the destination 550. For example, one path from NE A 530 to NE E 530 is via NEs B 530 and NE D 530. Another path from NE A 530 to NE E 530 is through NE C 530. The ICN controller may measure a set of metrics for the test flow and any other network flows determined by a given network state by emulating data flows through each determined test path. It should be noted that the system 500 may be configured as shown or alternatively configured as determined by a person of ordinary skill in the art to achieve similar functionalities.

Figure 6:
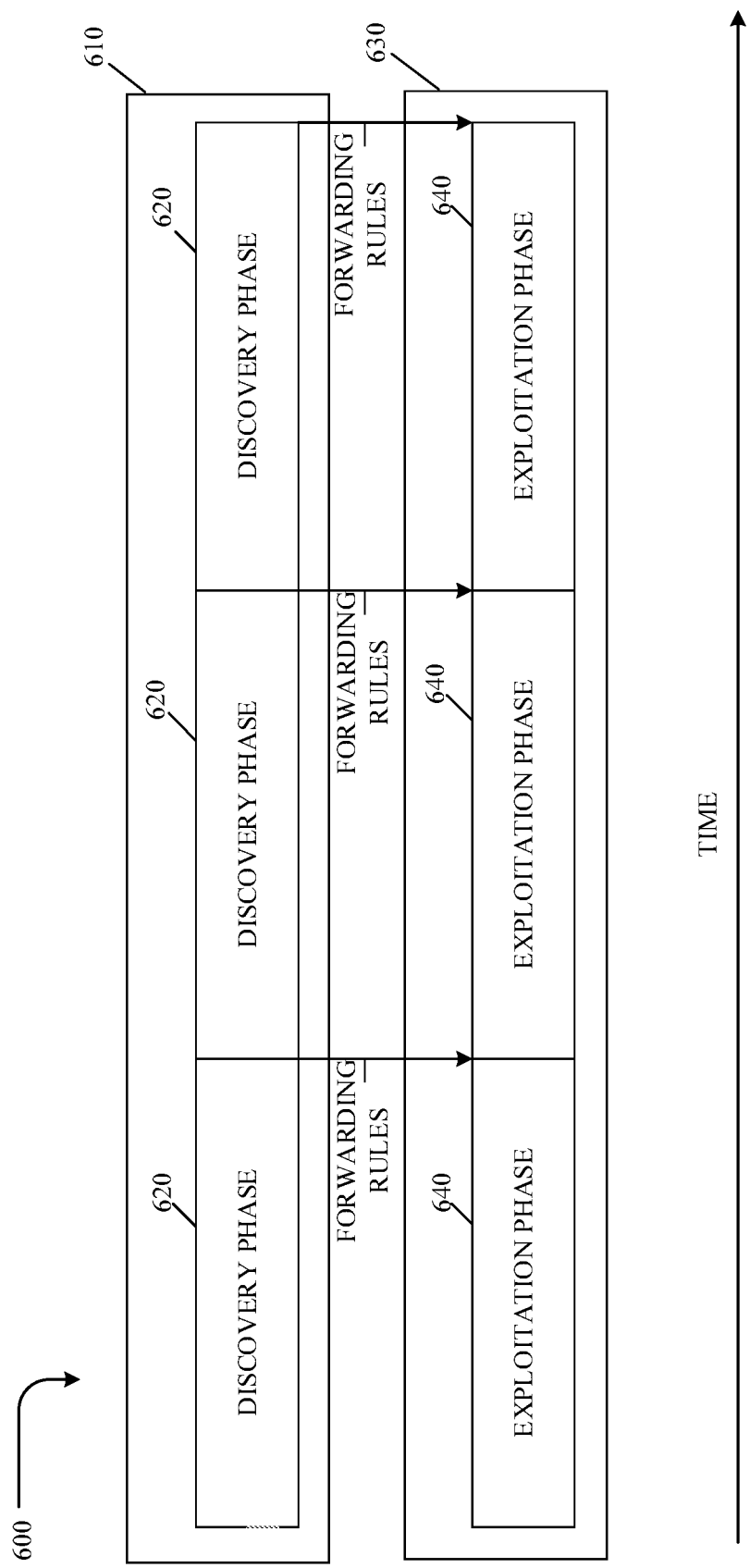
FIG. 6 is a timing diagram showing the distribution of forwarding rules from the control plane to the forwarding plane.

FIG. 6 is a timing diagram showing the distribution 600 of forwarding rules, such as forwarding rules 330, from the control plane 610, such as control plane 115, to the forwarding plane 630, such as forwarding plane 150. Distribution 600 may be implemented in an ICN, such as ICN 105. The NE within the ICN conducts the discovery phase 620, such as discovery phase 415, in the control plane 610 by, for example, an ICN controller, such as ICN controller 110. The forwarding rules created during the discovery phase 620 are distributed to the forwarding plane 630. The forwarding plane 630 then utilizes the received forwarding rules in an exploitation phase 640. During the exploitation phase 640, pathing on the forwarding plane for traffic flows is determined according to the forwarding rules. When the forwarding plane 630 receives a new set of forwarding rules, the new exploitation phase 640 begins where the new set of forwarding rules are utilized in the forwarding plane. In the shown embodiment, the discovery phases 620 and the exploitation phases 640 occur simultaneously and each restarts following the distribution of the forwarding rules with no time gap between the phase cycles. In some embodiments, the exploitation phase 640 continues until new forwarding rules are received, as shown, but in other embodiments an interval of time may be present between the end of one discovery phase 620 and the beginning of the next discovery phase 620. The length of time for each phase as well as the interval of time between the sets of discovery phases may be determined by a configuration of the ICN.

Figure 7:
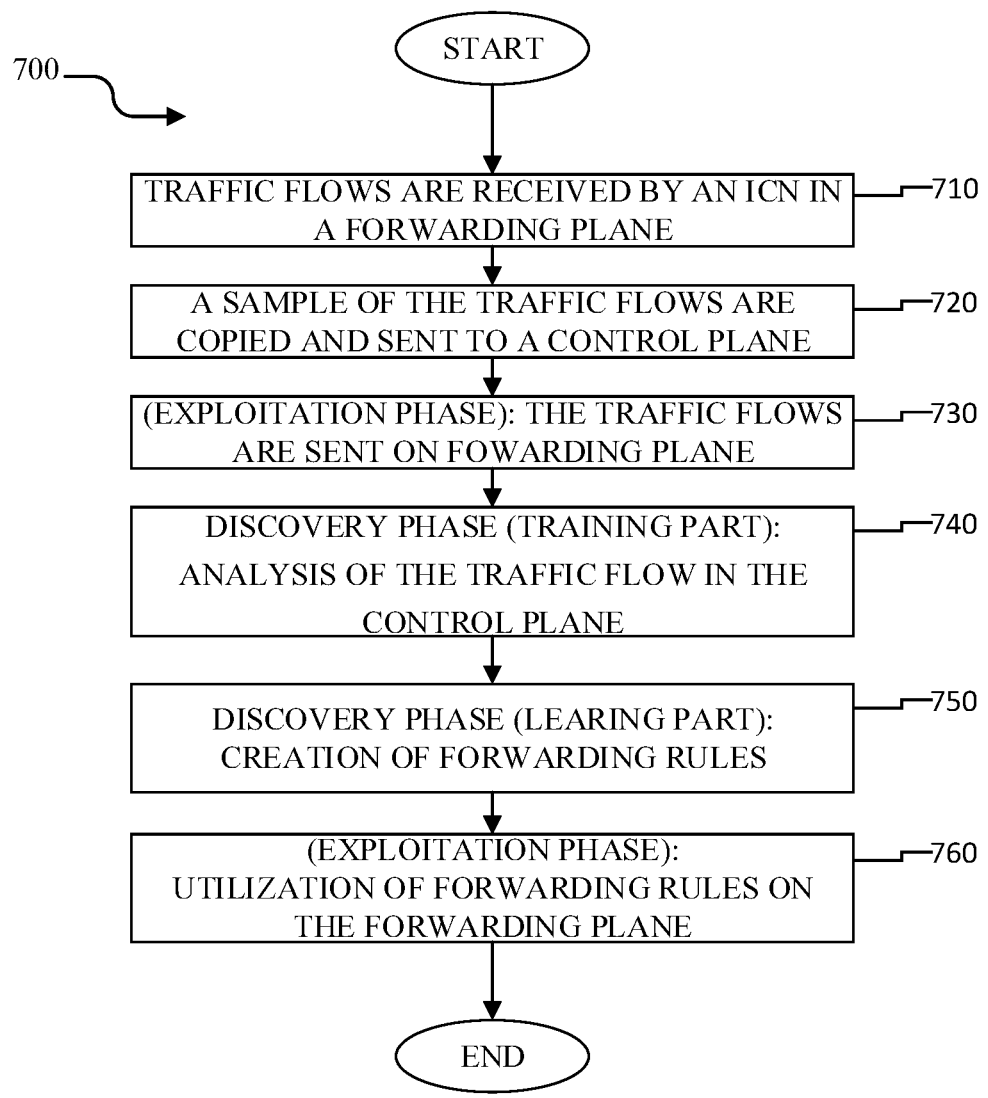
FIG. 7 is a flowchart of an embodiment of a method of determining forwarding rules for content arriving in the forwarding plane of an ICN.

FIG. 7 is a flowchart of an embodiment of a method 700 of determining forwarding rules for content arriving in the forwarding plane of an ICN, such as ICN 105. Method 700 may be implemented by NEs, such as ICN controller 110, within an ICN, such as ICN 105. Method 700 may be implemented when an ICN controller receives test traffic flows. At block 710, traffic flows are received by NEs acting as content nodes, such as NEs 130, in the forwarding plane of an ICN. The traffic flows can be received at network components considered as a source. Each source may be at the edge of the ICN or some portion of the ICN under analysis. At block 720, a subset of traffic flows received in the forwarding plane are copied and sent to the control plane as test traffic flows. At block 730, the received traffic flows are sent on the forwarding plane based on previously determined forwarding rules. In some embodiments, the forwarding rules are optimized based on the results from a previous discovery phase. In one embodiment, copies of the traffic flows, e.g., test traffic flows, are forwarded to the control plane and the traffic flows are forwarded on the forwarding plane at substantially the same time. In an exemplary implementation, the received traffic flows are forwarded on the forwarding plane without waiting for results of the discovery phase from the control plane.

At block 740, a training part of the discovery phase is performed in the control plane. The training phase begins the analysis of the test traffic flows. The subject of the analysis can be an impact in the forwarding plane for each active traffic flow, any previously observed test traffic flows and test traffic currently under observation. The impact may include the delivery time of the traffic flows on the forwarding plane. The analysis can be directed at the delivery times associated with multiple candidate paths for each of the test traffic flows. In an embodiment, the analysis includes emulating at least a portion of an aspect of the forwarding plane. In an exemplary implementation, a simulation or emulated representation of the forwarding plane is used in the analysis. It is appreciated that the analysis can be directed to facilitating performance and resource allocation with respect to a single test traffic flow. The analysis can also be directed to facilitating overall performance and resource allocation (e.g., with respect to multiple test traffic flows, overall impacts on resources associated with multiple paths, etc.). In an embodiment, a candidate path is selected for each test traffic flow and recorded.

At block 750, the learning part of the discovery phase analyses the candidate paths for the test traffic flows recorded in a previous training part. Based on the analysis and through a process of machine learning, forwarding rules are built and optimized. The forwarding rules are then distributed to the forwarding plane. At block 760 referred to as the exploitation phase, resources are scheduled or pathed on the forwarding plane based on the distributed forwarding rules. For example, traffic flows received by the ICN after the distribution of the forwarding rules are forwarded on the forwarding plane in accordance with the forwarding rules. The scheduling of resources can include dynamic fine-grained resource allocation. The traffic flows may include content objects and the scheduling can include assigning a content object or data packet within a traffic flow to a path in the forwarding plane. The received traffic flows may be forwarded to a network component considered a destination. The destination can be at the edge of the network or some portion of the network under analysis.

It is appreciated that the presented approaches can have a variety of implementations. In one embodiment, copies of a plurality of traffic flows are sent to the emulator for utilization in the analysis. In one embodiment, a wide range of network conditions are observed or sent to the control plane and the emulation is performed on the observed network conditions. Similarly the analysis can be performed based on the observed network conditions. Having a wide range of observed network conditions can enable valuable or more accurate analysis results. In one exemplary implementation, 10,000 traffic flows are sent to the control plane and analyzed, and the first 1,000 traffic flows are used for learning and/or developing the forwarding rules or policies. The process of evaluation and analysis for rule or policy learning can start for another 1,000 traffic flows later on. In one embodiment, traffic flows containing large items of content (e.g., 10,000, 15,000, 17,000, etc.) can be forwarded to both the control plane and the forwarding plane. The control plane may perform evaluation and analysis on a first block of content (e.g., the first block can be 1,000, 1,200, etc. pieces of content), let a second block of content (e.g., the second block can be next 2,000, 2,100, etc. pieces of content) go by without performing evaluation and analysis, and then perform evaluation and analysis on a third block of content (e.g., the next 800, 1,000, 1250, etc., pieces of content). In one embodiment, all the received traffic flows are forwarded on forwarding planes even if the control panel does not perform an evaluation and analysis of all the traffic flows.

In an embodiment, a content-based traffic engineering mechanism and a resource allocation policy are implemented to reduce the response time of the network for delivering a piece of content. In another embodiment, the control loop for resource allocation requires knowing the actual rate of data transfer for a flow after it has been allocated, which in turn requires for the content allocation mechanism to either estimate the performance of the transport layer, or to learn it. In yet another embodiment, a resource allocation mechanism learns the desired allocation over a training period. A policy associated with the desired allocation is implemented. In one embodiment, a policy is implemented for a period of time, before training again and repeating the cycle. In another embodiment, the proposed mechanisms are evaluated both in a Java simulator (e.g., built for this purpose, etc.) and using Network Simulator-2 simulations. It is appreciated that significant gains in response time for a wide range of network conditions in both Wide-Area Network (WAN)-like and Data Center-like topologies can be achieved. The fine-grained resource allocation sets performance of presented ICN approaches apart from the current IP network architecture. The policies described herein can demonstrate a significant gain over the minMLU algorithm (defined above) and over the results of other previous approaches. However, these are heuristic policies that employ learnings to determine optimal policies. It is appreciated, that others policies and methods can be implemented by employing the disclosed embodiments.

Figure 8:
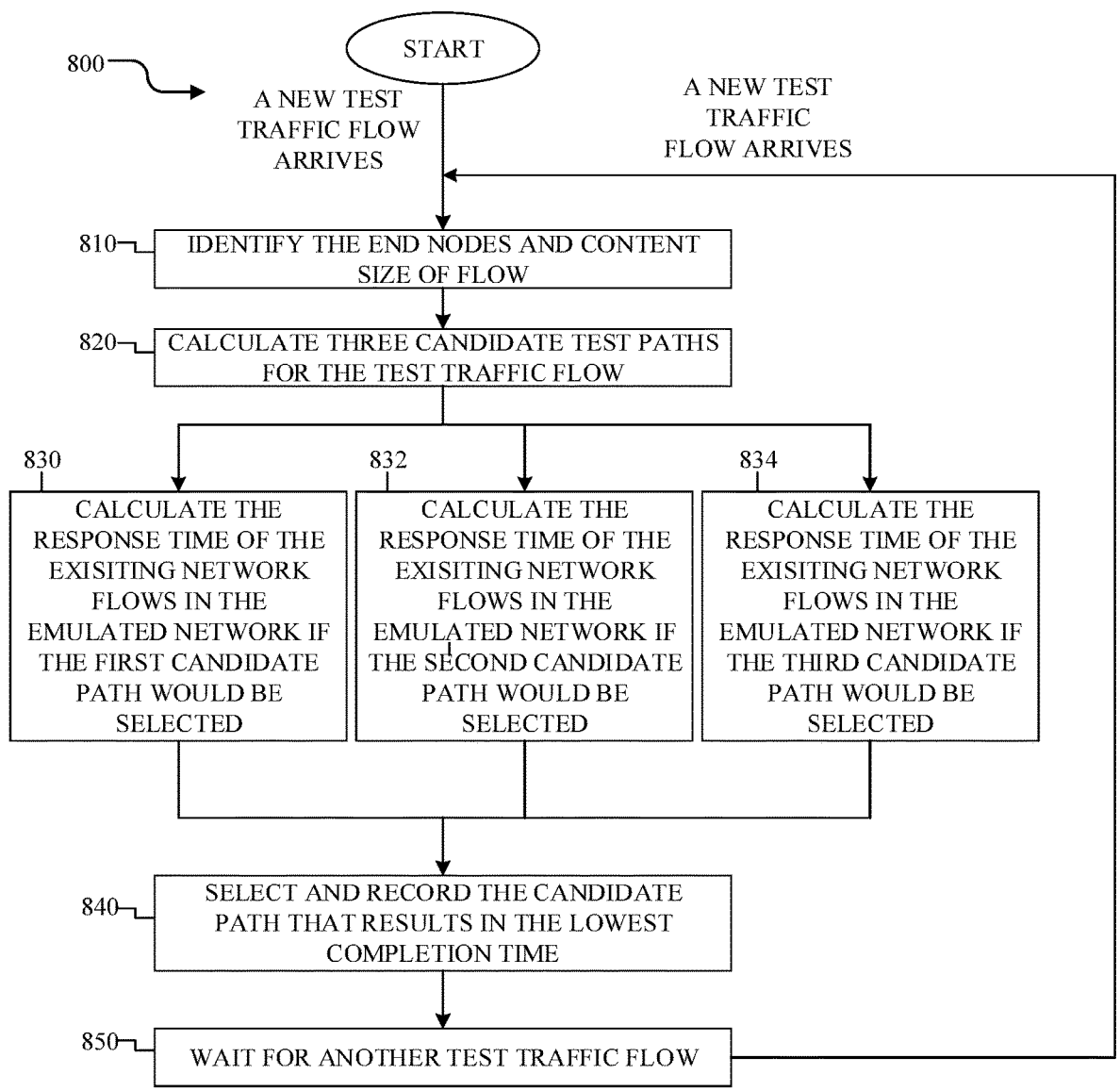
FIG. 8 is a flowchart of an embodiment of a method of a train part of a discovery phase.

FIG. 8 is a flowchart of an embodiment of a method 800 of preforming a training part, such as training part 420, of a discovery phase, such as discovery phase 415. Method 800 may be implemented by a NE, such as ICN controller 110, within an ICN, such as ICN 105. Method 800 may be performed in an emulated forwarding plane of the ICN, such as emulated forwarding plane 310, in the control plane of an ICN, such as control plane 115. For example in an exemplary embodiment at step 810, the ICN controller receives a new test traffic flow. The ICN controller then identifies the source and destination nodes and the packet size of the test traffic flow. At step 820, the ICN controller calculates three candidate test paths for the test data flow. At step 830, the ICN controller calculates the response time of the existing network flows and any path selected for previously examined test flows in the emulated network if the first candidate path would be selected. At step 832, the ICN controller calculates the response time of the existing network flows and any path selected for previously examined test flows in the emulated network if the second candidate path would be selected. At step 834, the ICN controller calculates the response time of the existing network flows and any path selected for previously examined test flows in the emulated network if the third candidate path would be selected. At step 840, the ICN controller selects and records the candidate path that results in the aggregated lowest completion time for the considered flows. At step 850, the ICN controller waits for another test traffic flow.

Figure 9:
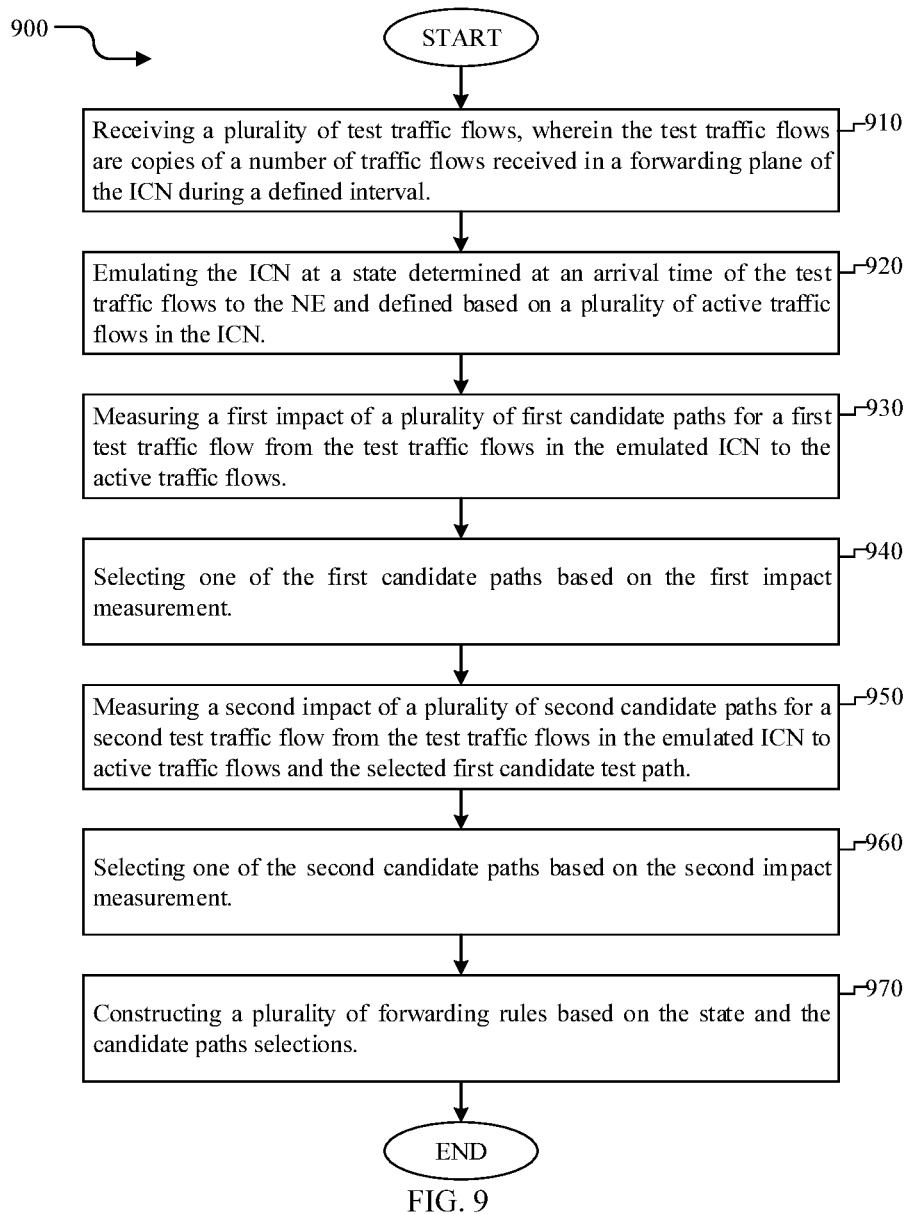
FIG. 9 a flowchart of an exemplary embodiment of a method determining forwarding rules.
Figure 5:
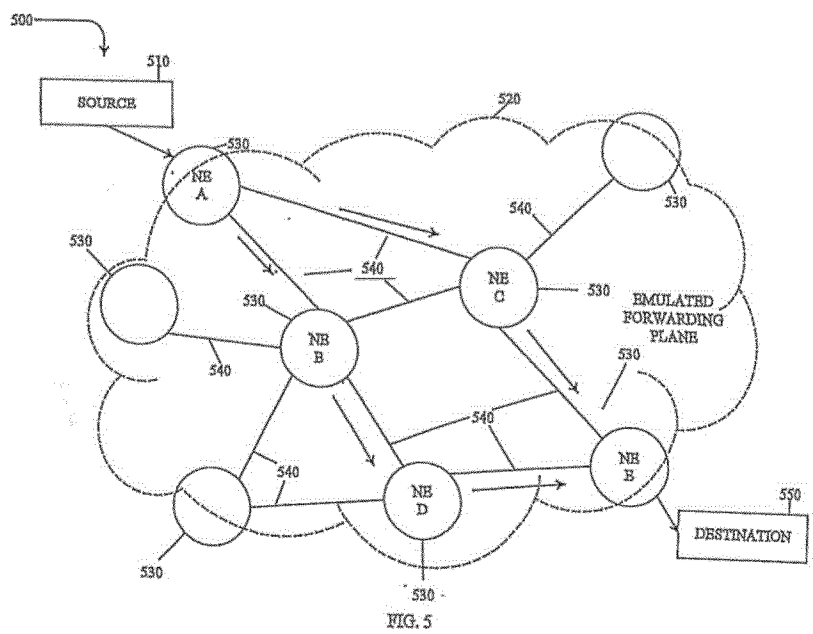

FIG. 9 is a flowchart of an exemplary embodiment of a method determining forwarding rules, such as forwarding rule 330. Method 900 may be implemented by an ICN controller, such as ICN controller 110, within an ICN, such as ICN 105. At step 910, the ICN controller receives a plurality of test traffic flows, wherein the test traffic flows are copies of a number of traffic flows received in a forwarding plane of the ICN during a defined interval. At step 920, the ICN controller emulates the ICN at a state determined at an arrival time of the test traffic flows to the NE and defined based on a plurality of active traffic flows in the ICN. At step 930, the ICN controller measures a first impact of a plurality of first candidate paths for a first test traffic flow from the test traffic flows in the emulated ICN to the active traffic flows. At step 940, the ICN controller selects one of the first candidate paths based on the first impact measurement. At step 950, the ICN controller measures a second impact of a plurality of second candidate paths for a second test traffic flow from the test traffic flows in the emulated ICN to active traffic flows and the selected first candidate test path. At step 960, the ICN controller selects one of the second candidate paths based on the second impact measurement. At step 970, the ICN controller constructs a plurality of forwarding rules based on the state and the candidate paths selection.

The following references have been used herein to provide context and explain how the new inventive approaches described in this document facilitate overcoming problems and issues with approaches described in the references. It is appreciated that the references alone or in combination do not teach nor render obvious the presented new inventive approaches.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method implemented by a network element (NE) configured to operate in an information centric network (ICN), the method comprising:

receiving a batch of test traffic flows, wherein the batch of test traffic flows are copies of a plurality of first traffic flows received in a forwarding plane of the ICN during a defined interval;

constructing a test path list comprising a determined optimal path for each of the batch of test traffic flows, wherein the determined optimal path is determined by formulating a plurality of test paths, simulating network traffic for each of the test paths in an emulated network corresponding to the ICN where a state of the emulated network is determined based on a plurality of active traffic flows in the ICN, calculating a metric for each of the test paths, and selecting a test path from the plurality of test paths as the determined optimal path based on the metric for the test path selected;

constructing a plurality of replacement forwarding rules based on current forwarding rules and the determined optimal paths contained in the test path list; and selecting routing paths for a plurality of second traffic flows based on the replacement forwarding rules, wherein the plurality of second traffic flows are received in the forwarding plane subsequent to the plurality of first traffic flows.

2. The method of claim 1, wherein the metric is a measurement of completion time of the active traffic flows.

3. The method of claim 1, wherein the plurality of first traffic flows are a subset of a total number of traffic flows received in a forwarding plane of the ICN during the defined interval.

4. The method of claim 1, wherein a number of test traffic in the batch of test traffic flows is determined based on a configuration of the NE.

5. The method of claim 1, wherein the replacement forwarding rules define a single routing path for a given traffic flow.

6. The method of claim 1, wherein the replacement forwarding rules define a plurality of routing paths for a given traffic flow based on a content object size of content within the given traffic flow.

7. The method of claim 1, wherein the replacement forwarding rules define a plurality of routing paths for a given traffic flow based on a congestion level of the ICN.

* * * * *

UNITED STATES PATENT AND TRADEMARK OFFICE
CERTIFICATE OF CORRECTION

PATENT NO. : 10,673,763 B2  
APPLICATION NO. : 16/058277  
DATED : June 2, 2020  
INVENTOR(S) : Serhat Nazim Avci et al.

Page 1 of 2

It is certified that error appears in the above-identified patent and that said Letters Patent is hereby corrected as shown below:

In the Drawings

Delete fig. 5 and substitute therefor the attached drawing sheet, consisting of fig. 5.

Signed and Sealed this
Twenty-seventh Day of October, 2020

Andrei Iancu
*Director of the United States Patent and Trademark Office*